C. H. STROWGER.
Improvement in Fences.
No. 127,282. Patented May 28, 1872.
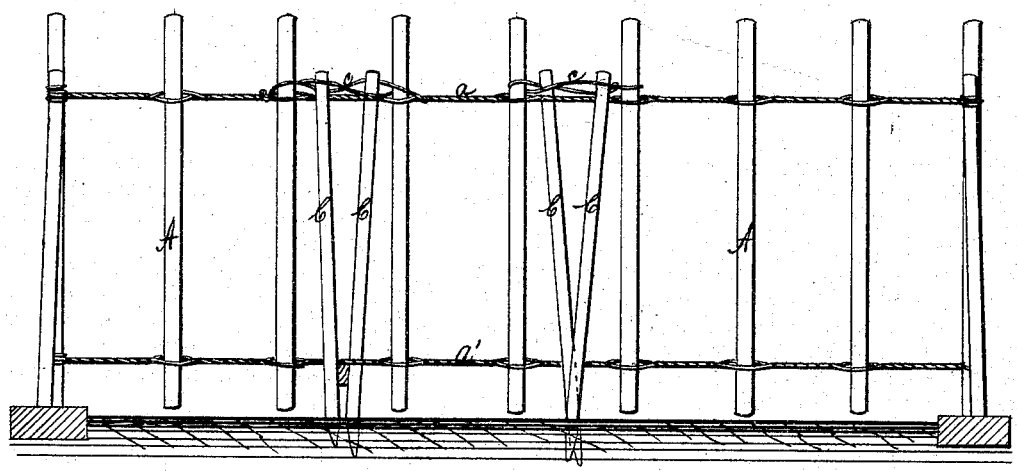
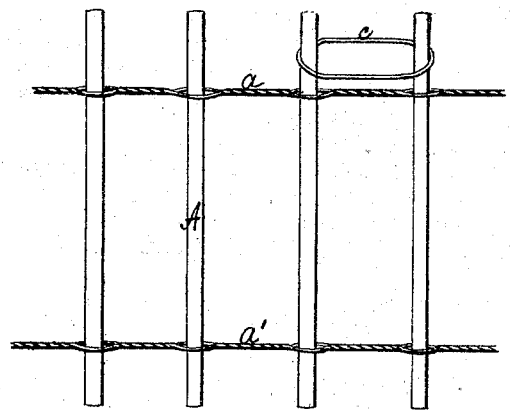
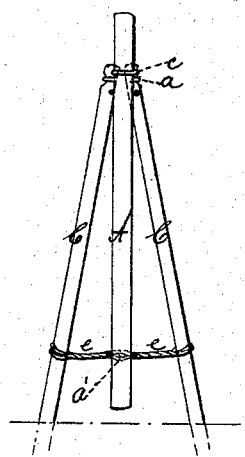
Witnesses: Inventor:

UNITED STATES PATENT OFFICE.

CHARLES H. STROWGER, OF WEBSTER, NEW YORK.

IMPROVEMENT IN FENCES.

Specification forming part of Letters Patent No. 127,282, dated May 28, 1872.

Specification describing a certain Improvement in Wire-Picket Fences, invented by CHARLES H. STROWGER, of Webster, in the county of Monroe and State of New York.

This invention relates to that kind of fence which is composed of pickets supported by an upper and lower set of wires stretched, in the first instance, between terminal posts, and braced by means of stakes having notched upper ends, and placed at suitable intervals. The invention consists in certain improvements in the means of connecting the upper part of the fence with the upper parts of said stakes, all as hereinafter described.

Figure 1 is a side elevation of the fence. Fig. 2 represents a detached portion of the fence, showing the loop prior to inserting the stakes; and Figs. 3 and 4 are transverse sections at different points in the fence.

A are the pickets aforesaid; $a$, the upper set of wires; and $a'$, the lower set; these pickets being interwoven with the wires in the manner explained in my patent of October 31, 1871. C are the stakes above mentioned, and $c$ are the wire-loops inclosing any two adjacent stakes above the wires $a$, and passed around said wires, if preferred; with each of which loops two stakes, C, are connected, preferably placing the stakes inverted, with their notched ends side by side in one of the loops, and tautening the same, and finally inserting the lower ends of the stakes in the ground or in sills. This is my improved method of connecting the upper part of the fence with the upper parts of the stakes; its advantage being that it increases the portability of the fence as compared with the method described in my said patent—viz., of connecting the stakes directly with the upper set of wires $a$.

Fig. 3 shows one of the stakes C driven vertically into the earth, or inserted in a block of stone, and placed in the line of the lower set of wires, which are bound to it. The other stake C is placed at an inclination to the first. The upper ends of the stakes are, in this case, passed through the upper set of wires, and also connected with one of the loops $c$. This arrangement admits of free passage on one side, close to the fence.

I claim as my invention—

The pickets A, combined with the notched stakes C and loops $c$, in the manner and for the purpose described.

C. H. STROWGER.

Witnesses:
 WM. T. MOORE,
 HORTON WILLCOX.